July 12, 1960 J. MARKUSEN 2,944,275
ROLLER SCRAPER
Filed Aug. 27, 1957
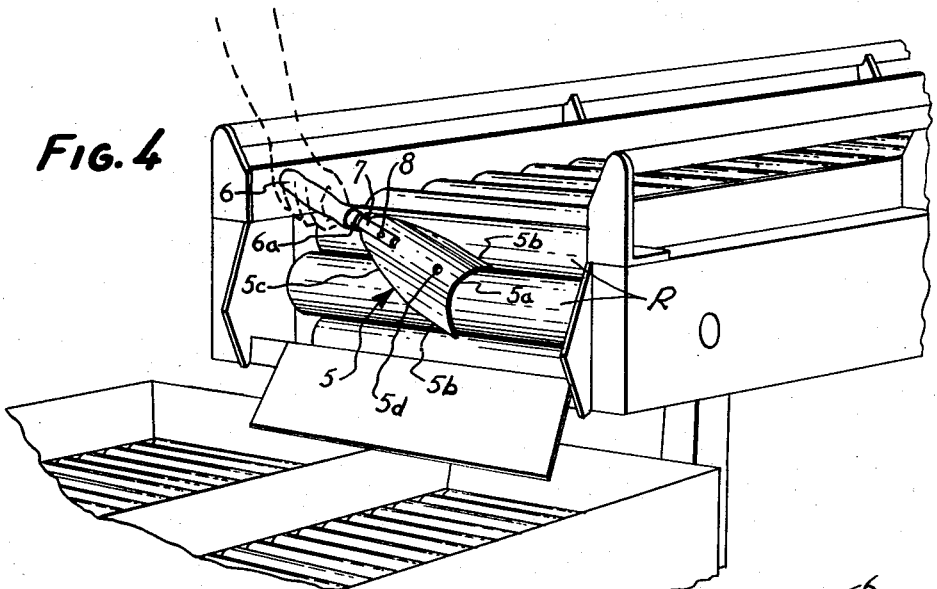
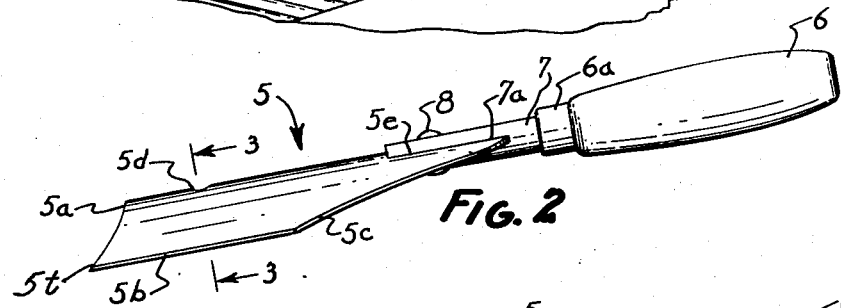
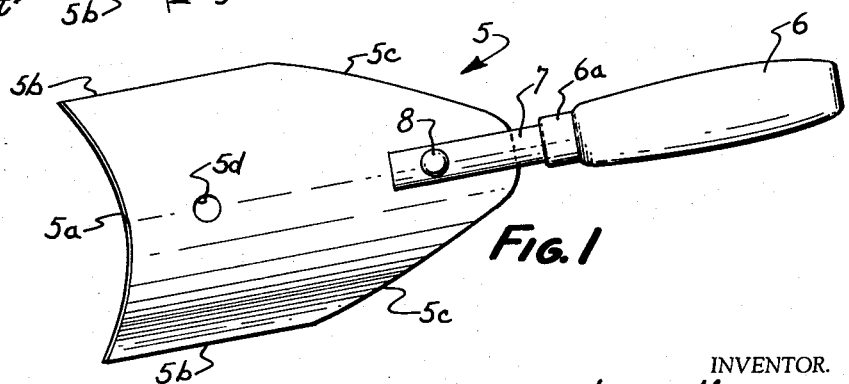
INVENTOR.
JIMMIE MARKUSEN
BY Williamson, Schroeder,
Adams and Meyers
ATTYS.

United States Patent Office 2,944,275
Patented July 12, 1960

2,944,275
ROLLER SCRAPER
Jimmie Markusen, Fairdale, N. Dak.

Filed Aug. 27, 1957, Ser. No. 681,872

1 Claim. (Cl. 15—236)

This invention relates to manually manipulated scrapers for quickly and efficiently removing accumulated material such as dirt and debris from rollers such as are employed in material-conveyor systems or the like.

For example, my scraping tool is particularly effective for readily removing accumulated debris such as soil, dirt, leaves and particles of vines from the rollers of crop-handling mechanism which employs a series of closely spaced rollers for moving soil-produced comestibles such as potatoes, soy-beans and other food products.

It is an object of my invention to provide a simple, economical roller scraper which is manually operated to quickly and effectively remove the accumulated dirt or debris from individual rollers with a minimum effort and scraping strokes.

A further object is the provision of a handle-equipped scraper blade conceived and constructed to cooperatively employ longitudinal scraping edges with forward transverse scraping edge to remove accumulated dirt and debris from cylindrical rollers.

More specifically, it is an object to provide a handle-equipped scraper provided with a forward transverse scraping edge which will impart in operation, a shearing action along an inclined path together with cooperating longitudinal scraping edges for the purposes previously recited.

These and other objects and advantages of my invention will be apparent from the detailed description of a representative embodiment taken in conjunction with the accompanying drawing, in which Fig. 1 is a top plan view of an embodiment of my invention;

Fig. 2 is a side elevation of the same;

Fig. 3 is a cross section taken on the line 3—3 of Fig. 2 and showing a slightly tapered contour of the scraper blade; and Fig. 4 is a perspective view illustrating a roller conveyor utilized in connection with potato grading and sorting mechanism and showing operation of my scraper on one of the rollers thereof.

As shown in the drawings, my roller scraper comprises a blade 5 preferably constructed of a hard metal and having an arcuate cross sectional shape as shown in Fig. 3, but tapering somewhat from the rear or attached portion thereof to the forward edge 5a. The forward scraping edge 5a generally lies in a plane inclined rearwardly relatively to the axis of longitudinal center line of the blade 5, thus defining free tip portions 5t which are adapted to intially engage diametrically opposing portions of a roller to be scraped.

The blade 5 has longtiudinal, substantially straight cooperating scraping edges 5b which preferably are beveled or somewhat sharpened as shown in Fig. 3, extending from the tip portions 5t to the intermediate portion of the blade. The blade, from said intermediate portion, is preferably diminshed and tapered in overall width along lines 5c to provide an attachment end 5e.

For convenience, in supporting the scraper or tool when not in use, I may provide an aperture 5d in the longitudinal, central portion of the blade for accommodating a hook, pin or other supporting element.

The diminished attachment portion 5e of the blade is received in a longitudinal slot 7a of a metal handle extension 7, thereby reinforcing the connection of the blade with a suitable handle 6 which in general, extends longitudinally of the axis of the blade. A collar 6a as shown, is interposed between the handle proper 6 and the extension 7.

The attachment portion 5e of the blade may be rigidly secured to handle extension 7 by any suitable means such as the rivet 8 or by welding.

In use, as illustrated in Fig. 4 wherein the dotted lines indicate a human forearm and hand, the scraper blade manipulated by the handle 6 readily conforms to the cylindrical shape of the rollers R. My tool is longitudinally reciprocated with the forward scraping edge 5a contacting the roller surface and with the sharpened edge thereof readily cutting and removing accumulated dirt and debris from the roller. In such scraping action, due to the rearward inclination of edge 5a, a shearing action as contrasted with pure scraping, is obtained through the inclination of edge 5a as described.

Simultaneously with the shearing action of the forward edge 5a, the longitudinal and preferably sharpened edges 5b of the blade also provide shearing action against the roller for facilitating the loosening and removal of accumulated dirt and debris. Thus, in operation of my scraper, cooperative action of the edges 5a and the longitudinal edges 5b takes place simultaneously.

The inclination of the curved forward edge 5a of the blade relative to the general longitudinal axis of the blade provides not only the tips 5t which are effective in cutting and releasing accumulated material, but affords side cutting portions inclined in a direction rearwardly from the tips 5t to facilitate removal of accumulated dirt.

From the foregoing description, it will be seen that I have provided an extremely simple scraping tool for quickly and positively removing accumulated soil, dirt and debris from the peripheral surface of rollers and wherein cooperative action from a terminal scraping edge having shearing facilities is coupled with shearing facilities provided by longitudinal edges of the tool.

The tips 5t at the forward end of my scraper provide in addition to their contour, the forward scraping edge points which are of use in initially breaking up accumulated deposits.

What is claimed is:

A scraper for longitudinally removing accumulated material from a cylindrical member such as a roller comprising a substantially rigid continuous, unbroken metal blade of arcuate cross sectional shape substantially throughout its length and tapering from its rearward portion to the forward end thereof, the arc at the forward end of the said blade conforming generally in close relation to the peripheral shape of rollers to be scraped, a handle member rigidly affixed to the rear end of said blade and extending generally longitudinally therefrom, said blade having substantially straight, sharpened longitudinal edges extending generally parallel to a central plane which is perpendicular to the longitudinal central surface of said blade, said longitudinal edges providing a shearing action when the blade is longitudinally reciprocated against a roller and said blade having at its forward end a transverse concave scraping edge lying approximately in a plane which is inclined rearwardly in the direction of said handle, thereby providing spaced pointed tip portions at the forward extremity of said blade.

References Cited in the file of this patent
UNITED STATES PATENTS

| 435,500 | Hyde | Sept. 2, 1890 |
| 826,835 | Crump | July 24, 1906 |
| 828,996 | Blackburn | Aug. 21, 1906 |
| 1,437,199 | Same | Nov. 28, 1922 |
| 1,450,209 | Hays | Apr. 3, 1923 |
| 1,484,166 | Wolk | Feb. 19, 1924 |
| 2,212,197 | Roesch | Aug. 20, 1940 |